(12) United States Patent
Brantley (10) Patent No.: US 8,376,442 B1
(45) Date of Patent: Feb. 19, 2013

(54) LATCH ASSEMBLY FOR A REAR ROW STADIUM STYLE JUMP SEAT

(75) Inventor: Harry Keith Brantley, Auburn Hills, MI (US)

(73) Assignee: BAE Industries, Inc., Warren, MI (US)

( * ) Notice: Subject to any disclaimer, the term of this patent is extended or adjusted under 35 U.S.C. 154(b) by 0 days.

(21) Appl. No.: 13/246,791

(22) Filed: Sep. 27, 2011

(51) Int. Cl.
*B60J 7/00* (2006.01)
(52) U.S. Cl. ................ 296/65.09; 296/68.1; 297/337
(58) Field of Classification Search .............. 296/65.09, 296/68.1, 65.05, 65.16; 297/337
See application file for complete search history.

(56) References Cited

U.S. PATENT DOCUMENTS

| | | |
|---|---|---|
| 5,156,437 A | 10/1992 | Hayakawa et al. |
| 5,156,438 A | 10/1992 | Hayakawa et al. |
| 5,158,338 A | 10/1992 | Hayakawa et al. |
| 5,195,802 A | 3/1993 | Hayakawa et al. |
| 5,320,411 A | 6/1994 | Sera |
| 5,425,568 A | 6/1995 | Sliney et al. |
| 5,460,429 A | 10/1995 | Whalen |
| 5,476,307 A | 12/1995 | Whalen |
| 5,603,550 A | 2/1997 | Holdampf et al. |
| 5,800,015 A | 9/1998 | Tsuchiya et al. |
| 5,842,744 A | 12/1998 | Harmon |
| 5,882,080 A | 3/1999 | Houghtaling et al. |
| 6,012,771 A | 1/2000 | Shea |
| 6,481,799 B1 | 11/2002 | Whalen |
| 6,767,061 B2 | 7/2004 | Ogino et al. |
| 6,832,815 B2 | 12/2004 | O'Connor |
| 6,883,854 B2 | 4/2005 | Daniel |
| 6,883,868 B2 | 4/2005 | Yoshida |
| 6,902,234 B2 | 6/2005 | Becker et al. |
| 7,086,696 B2 | 8/2006 | Yudovich |
| 7,201,425 B2 | 4/2007 | Tsujibayashi et al. |
| 7,252,320 B2 | 8/2007 | Tsujibayashi et al. |
| 7,338,118 B2 | 3/2008 | Ichikawa et al. |
| 7,374,242 B2 | 5/2008 | Champ et al. |
| 7,611,200 B2 | 11/2009 | Jovicevic et al. |
| 7,740,311 B2 | 6/2010 | Taoka et al. |
| 7,780,234 B2 | 8/2010 | Grable et al. |
| 7,938,485 B1 | 5/2011 | Perciballi et al. |
| 2005/0146186 A1 | 7/2005 | Kinnou et al. |
| 2011/0109140 A1 | 5/2011 | Thompson |

FOREIGN PATENT DOCUMENTS

JP 2002127796 A 5/2002

*Primary Examiner* — Joseph Pape
(74) *Attorney, Agent, or Firm* — Gifford, Krass, Sprinkle, Anderson & Citkowski, P.C.

(57) ABSTRACT

A latch assembly with a first leg securing to a seat bottom and a second leg pivotally engaged to an upper end of a stanchion mount. A sector is pivotally slaved to the second leg opposing the stanchion and exhibits a bottom shoulder projection separating into first and second surface locations. A pendulum pivotally secures to the stanchion and seats against a first sector location with the seat bottom in a downward position. The seat bottom is rotated in an upward direction, causing a detent lever to pivot out of engagement with a notch location of a supporting frame and travel along an edge extending profile thereof, simultaneous with the sector displacing relative to the pendulum. The detent lever reestablishes seating engagement with a second notch location concurrent with the pendulum pivoting into engagement with a second sector location corresponding to an upwardly rotated position of the seat.

20 Claims, 10 Drawing Sheets

LATCH ASSEMBLY FOR A REAR ROW STADIUM STYLE JUMP SEAT

FIELD OF THE INVENTION

The present invention relates generally an inertial locking assembly in use with a pivoting seat. More specifically, the present invention teaches a rear-row stadium style seat in use with such as a pickup truck type vehicle and which in particular utilizes a foldable seat bottom.

BACKGROUND OF THE INVENTION

The prior art is well documented with examples of seat fold mechanisms for use with such as rear row vehicle seats. In particular, such seat fold mechanisms are known which are in use with "stadium style" seat assemblies incorporating a pivotal seat bottom (such as associated with a pickup rear seat), and which is convertible between a use/design position and an upwardly folded/stowed position.

References of note include U.S. Pat. No. 7,374,242 to Champ et al. and U.S. Pat. No. 7,780,234 to Grable et al., each of which exhibiting a form of inertial activated latch assembly in which a pendulum member is rotatably supported in displacing fashion relative to a pair of separated shoulder locations of a rotatable sector concurrent with a pivotally supported seat bottom frame associated with the jump seat being rotated from a downward (design) to upright (stowed) positions.

Additional references include the stadium style seat fold mechanism as set forth in U.S. Pat. No. 6,012,771, issued to Shea, and which discloses a seat bottom pivotally mounted relative to a seat back and movable between a seating position and an upright folded position. A detent mechanism provides a degree of resistance to movement of the seat bottom from the folded upright and the seating position. An inertia latch mechanism is provided for engaging the seat bottom in the folded upright position in response to a rapid deceleration of the vehicle such as caused by a collision.

U.S. Pat. No. 5,842,744, issued to Harmon, further teaches a seat dual position locking mechanism for locking a seat component in a stowed or use position for preventing sudden pivotal movement of the seat component in a sudden high energy acceleration or deceleration. The locking mechanism includes a support bracket adapted for mounting on the vehicle floor and a pivot plate pivotally mounted to the support bracket. The pivot plate is secured to the vehicle seat component for pivotal movement therewith. The pivot plate includes a plurality of lock teeth extending therefrom. A pendulum member or pawl is pivotally connected to the support bracket and operative for locking engagement with the lock teeth for preventing substantial seat component movement in a forward or rearward high energy impact.

SUMMARY OF THE INVENTION

The present invention discloses a latch assembly incorporated into a stadium style vehicle seat having a floor mounted stanchion exhibiting an upwardly extending support surface. A frame has a first leg securing along an extending side of a seat bottom and a second enlarged dimension leg pivotally engaged at an intermediate location to an upper end of the stanchion.

The enlarged dimension leg further exhibits spaced apart notched locations. A sector is pivotally slaved to the second leg opposing the stanchion and exhibits, along a bottom, a shoulder projection separating into first and second surface locations. A pendulum pivotally secured to the stanchion exhibit a profile seating against a first sector location in contact with the shoulder and concurrent with the seat bottom in a downward position.

A detent lever pivotally mounts in spring loaded fashion the stanchion and seats against the first notched location of the frame to maintain the seat bottom in the downward position. The seat bottom is grasped by a user and rotated in an upward direction, causing the detent lever to pivot out of engagement with the first notch and travel along an edge extending profile of the frame, simultaneous with the sector displacing relative to the pendulum so that the shoulder traverses along the end profile.

Upon the seat bottom rotating to an upwardly folded position, the detent lever re-establishing seating engagement with a second notched location concurrent with the pendulum pivoting into engagement with a second sector location in opposite edge abutting contact with the shoulder. The pendulum additionally responds to an inertial impact condition not associated with manual controlled rotation of the seat bottom, in either of said design or upright folded positions, by engaging the shoulder projection associated with the slaved sector to thereby prevent rotation of the first seat component.

Additional features include a pair of spaced apart stanchions between which is pivotally supported the seat bottom supporting frame. A seat back frame supporting bracket is pivotally secured to a remote extending end of the enlarged dimension leg offset from the pivotal engaged location and, upward pivoting of said the bottom, causes the seat back frame supporting bracket to simultaneously pivot a lower end of the associated seat back in a rearward and non-interfering fashion relative to the upwardly folding seat bottom.

A main clock spring is supported upon a reverse face of the stanchion and includes an extending end engaging a fixed tab projecting from the stanchion. An inwardly curled end of the clock spring seats within a notch associated with a main pin seating through aligning apertures in the interposed sector and seat bottom frame for pivotally supporting the frame and sector in further slaved fashion to the stanchion and such that the spring biases said pin and frame in a selected direction.

A leaf spring is secured to the sector in substantially aligning and interposing fashion between first and second bottom extending surfaces separated by the shoulder projection of the seat sector and the proximate located upper end profile of the pendulum. The leaf spring is initially spaced away from the sector upon contacting the pendulum, the leaf spring subsequently being compressed to align with said the surfaces and upper edge of the pendulum.

A rivet extends through an aperture established in an upper body portion of the pendulum, proximate the upper end profile, and seats through an aperture in the stanchion support surface, the pendulum further comprising a weighted lower portion extending integrally from the upper body portion. First and second pairs of spaced apart stanchion supports, each pivotally supporting a seat bottom supporting frame arranged on opposite ends of first and second seat components associated with a 60/40 rear stadium seat assembly, with a first latch assembly being arranged on a first side of a first selected seat component and a second latch assembly being arranged on a second opposite most side of a second selected seat component. A detent lever supporting rivet seats through an aperture at a generally intermediate location of the lever and separating a notch engaging trigger end and an opposite spring biased end which is influenced by a torsion spring mounted around the lever supporting rivet.

A fixed and supporting cover exhibits first and second mounting apertures aligning with pivotal supporting apertures associated with the sector and pendulum and overlays the sector and pendulum on an inboard side of the stanchion between the stanchion and seat bottom frame. A second fixed and supporting cover partially overlapping the first cover and which is mounted by a series of stop rivet, spacer rivet and detent lever supporting rivet seating through aligning apertures at corner locations of the second cover which mounts the second cover on an inboard side of the stanchion interposed fashion between the stanchion and seat bottom frame, the stop rivet abutting a configured opposing edge of the seat bottom frame at a lower most rotated position.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
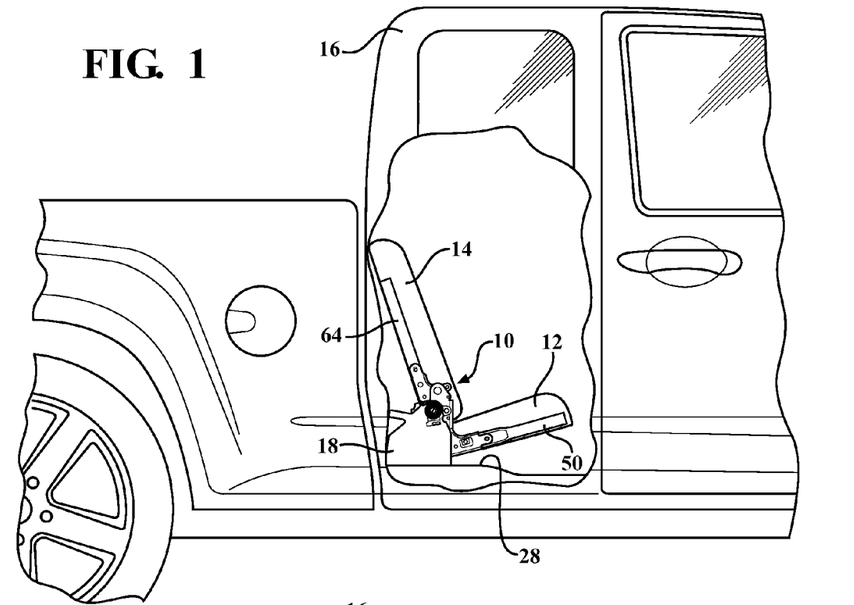
FIG. 1 is an environmental plan view in partial cutaway illustrating the seat latch assembly according to a first variant incorporated into a rear row jump seat in design position with the seat bottom downwardly folded.
Figure 2:
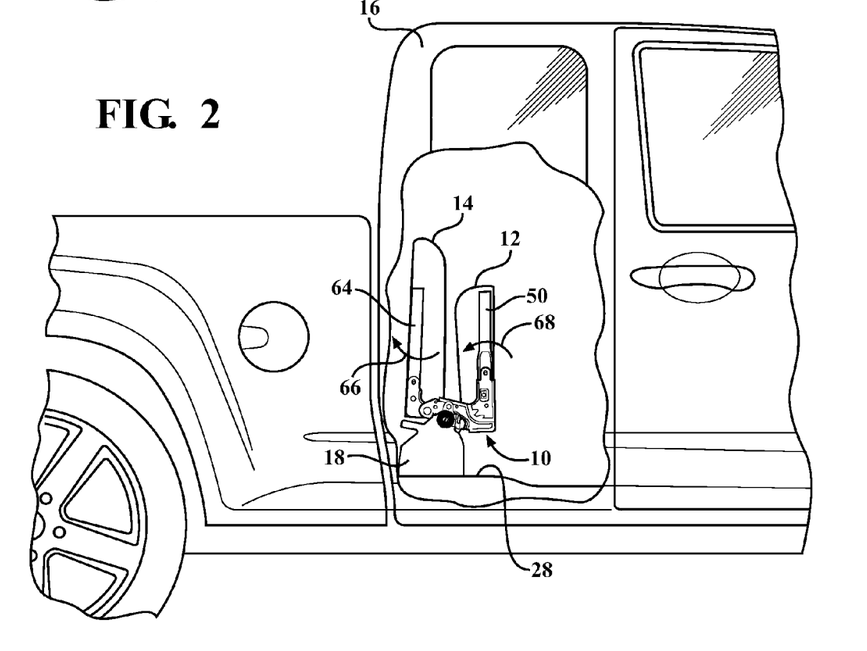
FIG. 2 is a succeeding view to FIG. 1 illustrating the range of pivotal motion of the seat bottom between the design position and an upwardly folded and stowed position, and further illustrating a corresponding combination angular and linear displacement of the seat back occurring during upward pivoting of the seat bottom.

With reference initially to the first variant of inertial latch collectively depicted at 10 in FIGS. 1-6, and referring initially to the environmental plan views of FIGS. 1 and 2, a rear row jump seat is illustrated incorporating the seat latch assembly 10 in respective downwardly rotated (design) and upwardly folded (stowed) positions. The environmental view illustrates a seat bottom 12 foldable relative to a seat back 14 within a rear seat location of a vehicle 16 such as a pickup style truck although it being further understood that the jump seat latch assembly described herein is not necessarily limited to any specific vehicle but can also include being incorporated into other vehicles and, in specific instances, to non-vehicular applications in which the benefits of the inertial controlled seat bottom is desired.

While the illustrations provided herein depict a single stanchion and supporting components, it is generally understood that each overall seat assembly utilizes pair of latch assemblies incorporated into spaced apart stanchion supports, defining first and second sides of a pivotally associated seat bottom and in which associated pivoting frame (such as depicting a modified "L" shape) components support the extending sides of the seat bottom, these typically associated with what is known as a 60/40 rear stadium seat assembly. In this arrangement, a first latch assembly is typically arranged on a first side (typically outboard) of a first selected seat component (e.g. 60% stadium seat), whereas a second latch assembly is arranged on a second opposite most side (opposite outboard) of a second selected seat component (40% adjoining stadium seat). It is also understood that other seat supporting arrangements, beyond those illustrated herein, are contemplated without limitation.

FIG. 2 is a further environmental plan view and illustrating the range of pivotal motion of the seat bottom 12 between the design position of FIG. 1 and upwardly folded stowed position shown. As will be described with further reference to the supporting illustrations of FIGS. 3-6, the upward pivotal displacement of the seat bottom 12 simultaneously influences a pivotally associated seat back frame to exhibit corresponding rearward angular displacement of the seat back in non-interfering fashion relative to the seat bottom.

Corresponding rearward angular displacement of the seat back provides for a more secure holding arrangement of the stadium-style seat in the stowed position. It is further understood that the a redesigned variant of the seat latch assembly could include only an inertial controlled seat bottom, without pivotally associated seat back frame support. One non-limiting aspect of such an application can include the seat back cushion being fixed in upright extending fashion or dispensed with entirely.

Figure 3:
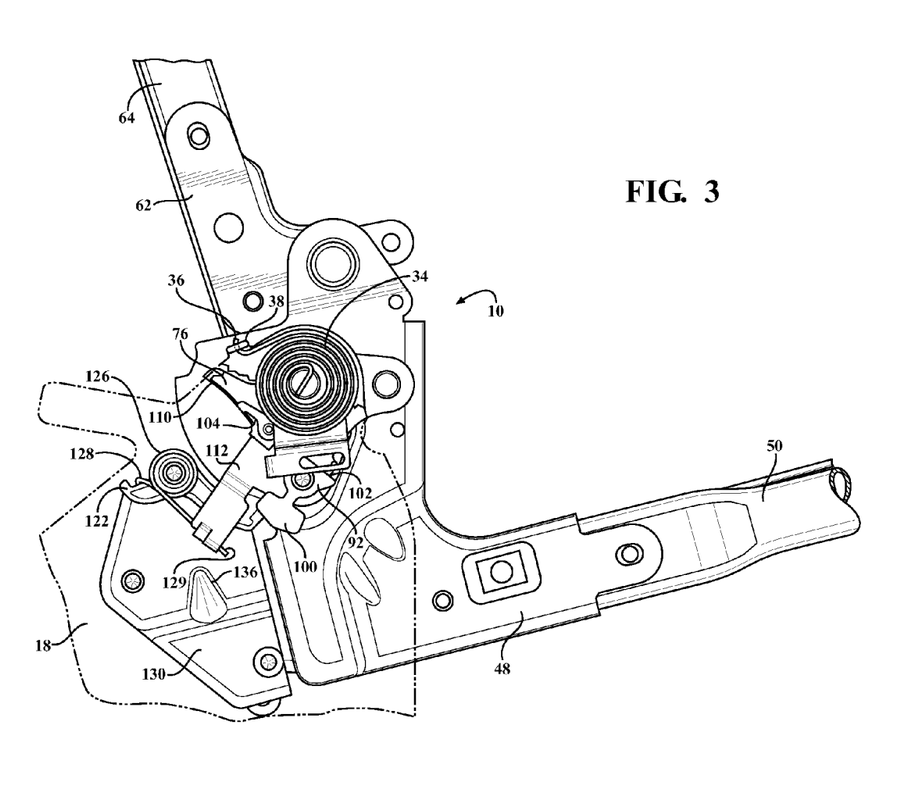
FIG. 3 is an enlarged side profile view of the latch assembly in the design position of FIG. 1 with stanchion illustrated in phantom and further depicting the relationship established between the pendulum and inertial support member as well as that established between the spring detent lever and first notched location defined in the rotatable seat bottom.
Figure 4:
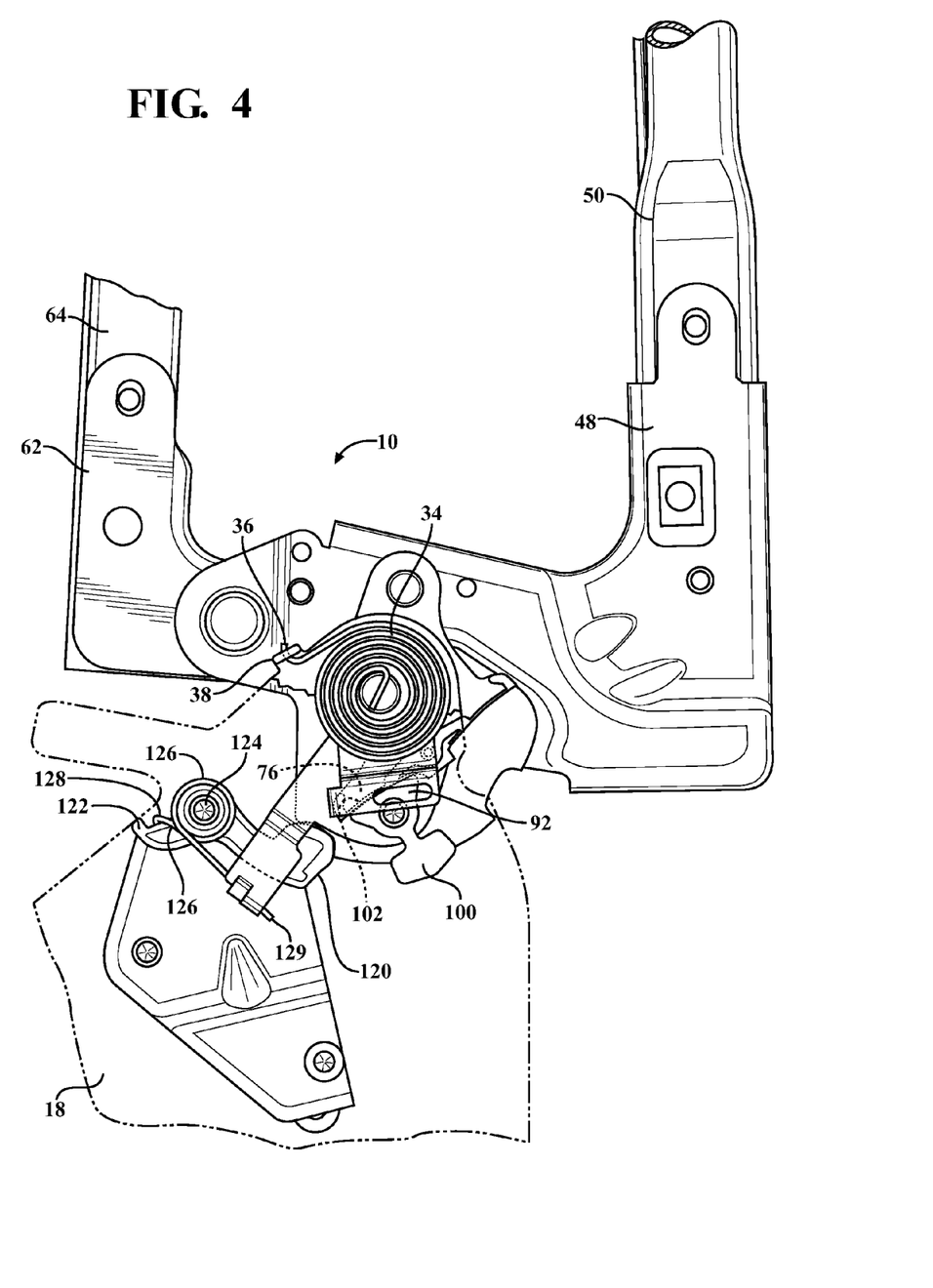
FIG. 4 is a corresponding enlarged side profile of the upright folded/stowed position of FIG. 2 and likewise better illustrating the shift in the pendulum relative to the second support shoulder established by the rotatably offset inertial support member, and corresponding to the manual displacement of the spring loaded detent to its re-established position relative to the second notched and circumferentially offset location of the seat bottom concurrent with the jump seat bottom being rotated to an upright/stowed position.
Figure 5:
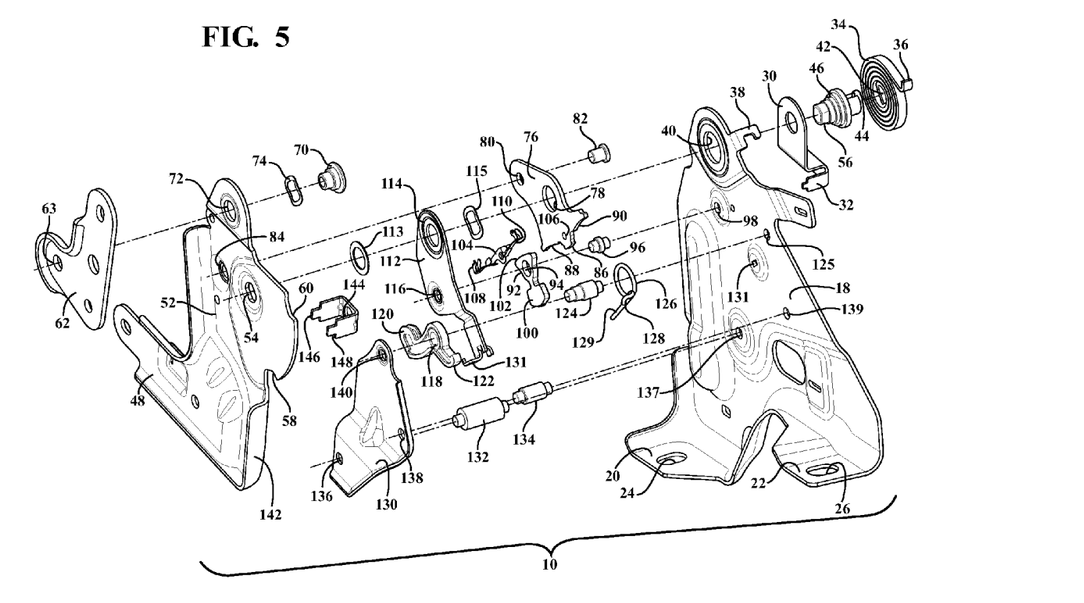
FIG. 5 is an exploded view of the latch design of FIG. 1.
Figure 6:
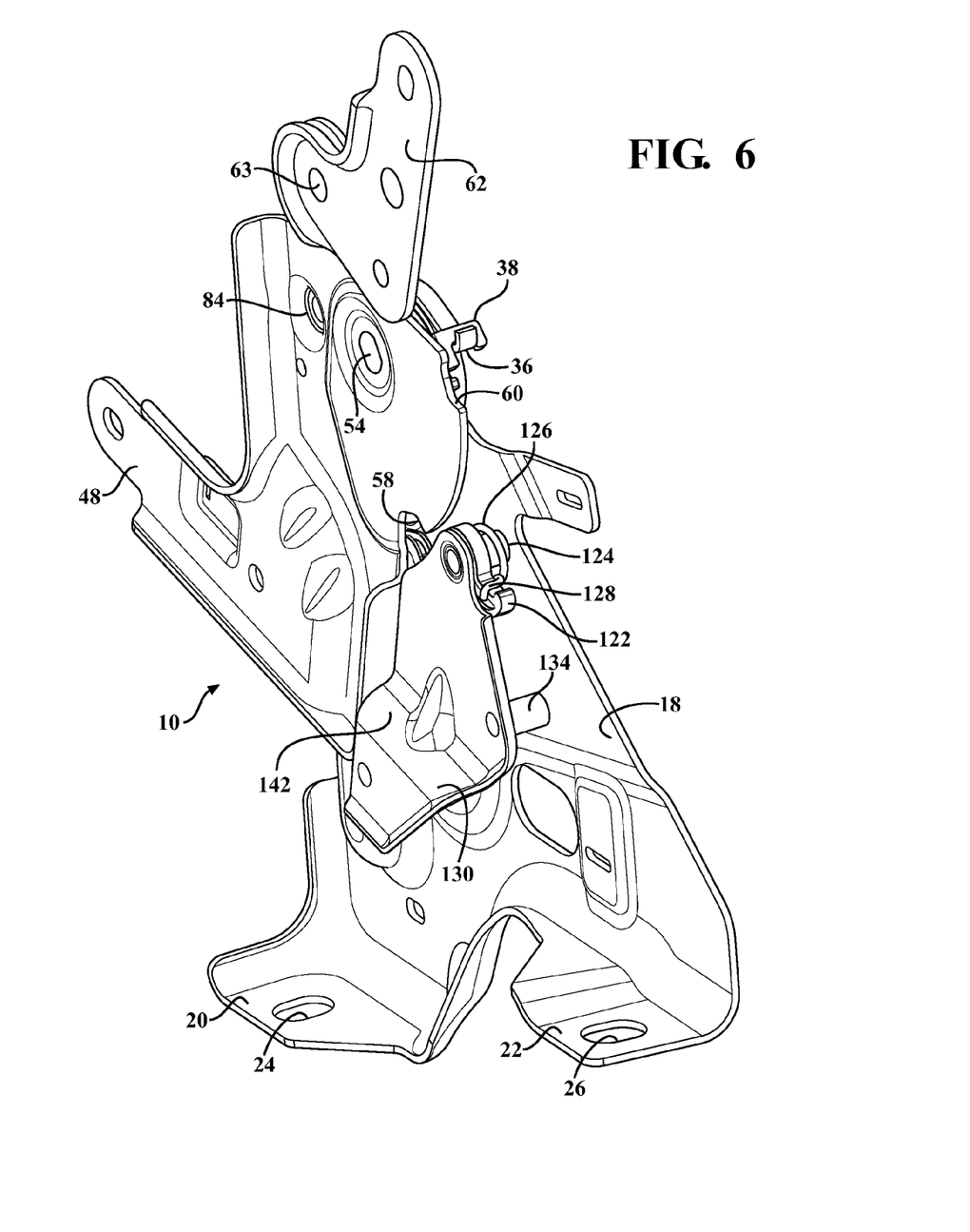
FIG. 6 is a corresponding assembled perspective view of the latch design of FIG. 1.
Figure 7:
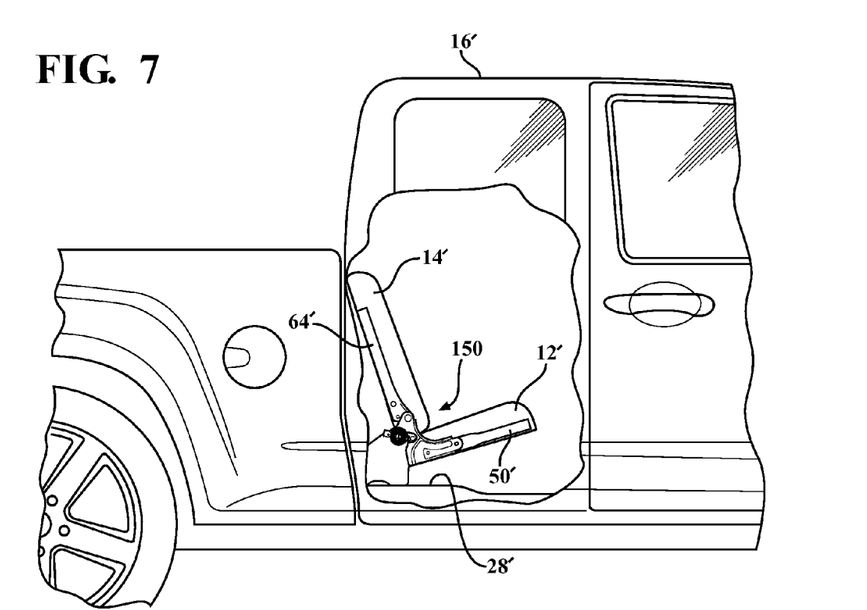
FIG. 7 is an environmental plan view in partial cutaway illustrating the seat latch assembly according to a second extended cab variant incorporated into a rear row jump seat in design position with the seat bottom downwardly folded.

With reference to succeeding illustrations FIGS. 3-6, the latch assembly 10 is incorporated into a vehicle seat including a stanchion support 18 (depicted in phantom in the succeeding plan views of FIGS. 3 and 4). The stanchion 18, as best shown in FIG. 5, can include any suitable material composition however, and in a preferred application, exhibits a suitable grade steel composition (as does all of the components hereinafter described).

The stanchion 18 further exhibits a pair of downwardly curled edges 20 and 22 which exhibit mounting apertures 24 and 26 for receiving mounting bolts or like fasteners (not shown) for securing the stanchion to a floor location 28 (see FIGS. 1 and 2) of the vehicle 16. As described previously, a preferred variant contemplates a 60/40 stadium seat assembly and by which first and second pairs of stanchion supports (not shown) define opposite frame supporting ends of a pair of likewise width dimensioned seat bottoms 12.

The stanchion support 18 further exhibits a generally planar shaped and upwardly extending support surface. An outboard (rear) side attachment bracket 30 is provided, such as which can be constructed of either a plastic or steel grade material and exhibits a substantially planar shaped and arcuate extending body with a curled, tab engaging end 32.

A clock spring 34 is supported upon the reverse (outboard) face of the upwardly extending stanchion support surface and includes an extending end 36 engaging a further fixed tab 38 projecting from an uppermost location of the stanchion 18, proximate an upper main pivot aperture (see inner perimeter wall 40) defined in an apex of the stanchion. An inwardly curled 42 end of the clock spring 34 seats within a notch 44 associated with a main pin 46 seating through the stanchion defined main pivot aperture 40 and likewise engaging, in slaved fashion, further defined components associated with the latch assembly 10 as will be now described.

A modified "L" shaped frame is shown and includes a first leg 48 securing along an extending side of a seat bottom 50 (see as best shown in enlarged plan views of FIGS. 3 and 4). The frame further includes a second enlarged dimension leg 52 pivotally engaged at an intermediate location (see keyed aperture 54 as best shown in FIG. 5) which receives the keyed end profile (further at 56) associated with the main pivot pin 46 for pivotally slaving the seat bottom frame to the stanchion 18. An edge extending profile associated with the enlarged dimension leg further exhibits first 58 and second 60 spaced apart notched locations.

A seat back frame supporting bracket 62 is pivotally secured, via receiving apertures 63 to a remote extending end of the enlarged dimension leg 52 offset from the pivotal engaged (keyed) location 54. Upward pivoting of the seat bottom 50, as depicted in FIGS. 2 and 4, causes the seat back frame supporting bracket 62 to simultaneously pivot a lower end of an associated seat back 64 (FIGS. 2 and 3) in a rearward and non-interfering fashion relative to said upwardly folding seat bottom (see as further depicted in FIG. 2 and which illustrates the seat back 64 pivoting rearwardly along a lower most location (see arrow 66) relative to the upward rotation (see further arrow 68 in FIG. 2) of the seat bottom 50.

As further best shown in FIG. 5, a seatback pivot pin 70 extends through an aperture 72 in the modified "L" shaped frame member (offset from main keyed pivot location 54) and engages the seat back supporting bracket 62 through its mounting aperture 63. A wave washer 74 is sandwiched between the pivot pin 70 and the opposing face of the seatback bracket 62 to facilitate smooth displacement of the seatback during its motion cycle indicated between FIGS. 3-4.

A substantially planar shaped sector is illustrated at 76 and likewise includes a steel or like construction. The sector 76 is anchored to an inboard side of the modified "L" shaped member in a pivotally slaved manner, and between the seat bottom member and the stanchion 18. A first (main) aperture 78 in the sector 76 receives the keyed insertion portion 56 of the main pivot pin 46, a secondary aperture 80 receiving a secondary mounting rivet 82 for securing the sector 78 in alignment with a further aperture 84 in the enlarged dimensioned leg 52 in a desired stand-off relationship. The sector 76 further exhibits a bottom extending surface including a generally central shoulder projection 86 separating the surface into first 88 and second 90 subset locations.

An inertially engaging pendulum is provided and includes a first upper and generally triangular shaped upper body portion 92 mounted in a slightly rotating and sandwiching fashion to the stanchion 18, via an upper location defined aperture 94 which receives an associated mounting rivet 96 likewise mounting to a further apertured location 98 in the stanchion 18. The pendulum further exhibits a weighted lower portion 100 extending integrally from the upper portion 92. An upper and slightly arcuate edge configuration 102 of the pendulum seats against a first location 88 of the sector 76, in abutting edge contact with the dividing projection 86, and concurrent with the seat bottom being in the downward design position of FIGS. 1 and 3.

An inertial responsive leaf spring 104 is secured to the underside of the sector 76 in substantially aligning and interposing fashion between the first 88 and second 90 bottom extending surfaces. A sector rivet (not shown) engages through a central mounting location associated with the leaf spring 104 and an adjoining mounting hole 106 defined in a lower location of the sector 76, in order to secure to the shoulder projection 86 of the sector 76. First and second outwardly extending wing portions associated with the leaf spring 104, see at 108 and 110, are secured in closely spaced fashion relative to the bottom surfaces 88 and 90 of the sector.

A fixed and supporting cover 112 exhibits a first 114 mounting aperture (with main pivot washer 113 arranged on one side of the cover 112 and pivot wave washer 115 on the other), a second mounting aperture 116 aligning with the pivotal supporting apertures associated with the sector 76 (at 78) and the pendulum (at 94). The cover 112 is configured so that it overlays the sector 76 and pendulum 92, 100 on an inboard side of the stanchion 18, between the stanchion and the seat bottom frame 48, 52. The cover 112 is intended to provide additional structural support to the slaved sector 76 and inertial/pivotally responsive pendulum and, by virtue of the forces exerted during dynamic operation, to prevent the occurrence of undesirable misalignments between the components (in particular relating to the fairly tight tolerances which is established between the coactive upper surface 102 of the pendulum and bottom sections 88 and 90 and intermediate shoulder projection 86 of the sector 76) and which may otherwise compromise smooth operation of the assembly.

A detent style lever is configured (such as to include either a metal or plastic spring loaded part) to include a generally intermediate an aperture location 118 separating a first notch engaging end 120 and an opposite spring biased end 122. An associated detent rivet 124 seats through another aperture location 125 in the stanchion 18 and about which a secondary torsion spring 126 is supported, a curled end 128 thereof engaging the end 122 of the detent lever (with an opposite extending end 129 engaging a location 131 of the first cover 112 to influence the notch engaging end 120 into contact with the selected notched location 58, 60 of the seat frame member.

A second fixed and supporting cover 130 partially overlaps the first cover 112 and is mounted by a series of stop rivet 132, spacer rivet 134 and detent lever supporting rivet (previously at 124) seating through aligning apertures 136, 138 and 140 at corner locations of the second cover 130, as well as additional apertures 137 (for seating stop rivet 132) and 139 (for seating spacer rivet 134) defined in the stanchion 18. In this manner, the second cover 130 is mounted on an inboard side of the stanchion 18 in interposed fashion between the stanchion and seat bottom frame (legs 48, 52), with the stop rivet 132 abutting a configured opposing edge 142 of the seat bottom frame at a lower most rotated position. Additional features include a U shaped plastic attachment/cushion bracket 144 with spaced apart extending and end defining legs terminating in mounting tabs 146 and 148 which secure the bracket to an outboard location of the seat bottom frame enlarged leg 52 in a manner which assists in spatially positioning the first cover 112.

In operation, and upon the seat bottom 50 being grasped by a user and rotated in an upward direction (again arrow 68 in FIG. 2), the pivotally associated and engaging end 120 of the detent lever (such as is shown to include three dimensional spaced and end walls interconnected by a recessed base wall in contact with an abutting profile of the fairly narrow cross section of the notched location 58) is caused to pivot out of engagement with the first notched location 58 and to travel along the edge extending profile associated with the enlarged leg 52 of the seat bottom frame. Simultaneously, the sector 76 is caused to displace relative to the defined end contour 102 of the pendulum such that its projecting shoulder 86 traverses along the upper end profile 102.

Upon the seat bottom 50 rotating to the upwardly folded position (FIGS. 2 and 4) the detent lever re-establishes a seating engagement with the second notched location 60, concurrent with the pendulum pivoting into engagement with the second sector location 90 in an opposite edge abutting contact with the shoulder 86 (and in comparison to the angular and abutting orientation of the pendulum assumed in the downward rotated/design position of the jump seat bottom 60 in FIGS. 1 and 3. The pendulum additionally responding to an inertial impact condition, not associated with manual controlled rotation of the seat bottom, in either of the downward design or upright folded positions, by engaging against the shoulder projection 86 associated with the pivotally slaved sector 76, thereby restraining/preventing rotation of the seat bottom.

The jump seat variant incorporating the latch assembly 10 of FIGS. 1-6 is designed (in one non-limiting application) to define an upward rotational range (again arrow 68 in FIG. 2) of 76 degrees between its design and upwardly folded/stowed positions. With further reference to a second and substantially identical set of illustrations depicted in FIGS. 7-12, a second latch assembly 150 is depicted and which corresponds to an extending cab variant 16' in which the latch assembly permits a slightly different 72 degree rotational range established between a seat bottom 12' and an associated seat back 14'.

The variant of FIGS. 7-12 is largely similar to that previously described in reference to FIGS. 1-6 such that many of the following components are repeated from the earlier embodiment. Also, and given that the functional aspects of this variant are identical as to the initial variant 10, the following will be limited to a corresponding structural description.

The latch assembly 150 is again incorporated into a vehicle seat including a stanchion support 152 (depicted in phantom in the succeeding plan views of FIGS. 9 and 10) further exhibiting a continuous downwardly curled edge 154 which exhibit mounting apertures 156 and 158 for receiving mounting bolts or like fasteners (not shown) for securing the stanchion to a floor location (at 28' and corresponding to as previously depicted in FIGS. 1 and 2) of the vehicle 16'. As again described previously, a preferred variant contemplates a 60/40 stadium seat assembly and by which first and second pairs of stanchion supports (not shown) define opposite frame supporting ends of a pair of likewise width dimensioned seat bottoms 12'.

The stanchion support 152 further exhibits a generally planar shaped and upwardly extending support surface. An outboard (rear) side trim mount bracket 160 is provided, such as which can be constructed of either a plastic or steel grade material and exhibits a substantially planar shaped and arcuate extending body with a curled, tab engaging end 162.

A clock spring 164 is supported upon the reverse (outboard) face of the upwardly extending stanchion support surface and includes an extending end 166 engaging a further fixed tab 168 projecting from a generally uppermost location of the stanchion 152, proximate an upper main pivot aperture (see inner perimeter wall 170) defined in an apex of the stanchion. An inwardly curled 172 end of the clock spring 164 seats within a notch 174 associated with a main pin 176 seating through the stanchion defined main pivot aperture 170 and likewise engaging, in slaved fashion, further defined components associated with the latch assembly 150 as will be now described.

Figure 9:
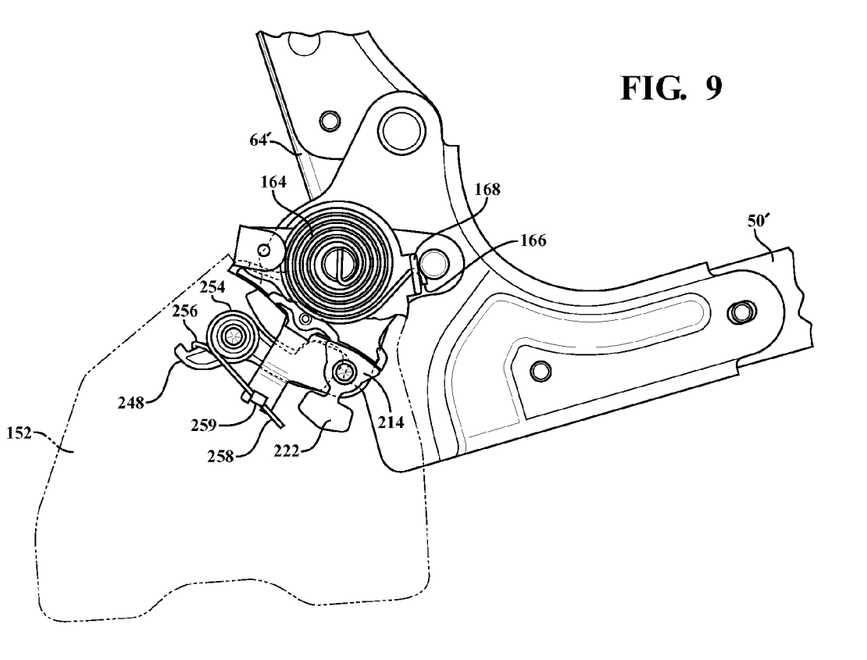
FIG. 9 is an enlarged side profile view of the latch assembly in the design position of FIG. 7 with stanchion illustrated in phantom and further depicting the relationship established between the pendulum and inertial support member as well as that established between the spring detent lever and first notched location defined in the rotatable seat bottom.
Figure 10:
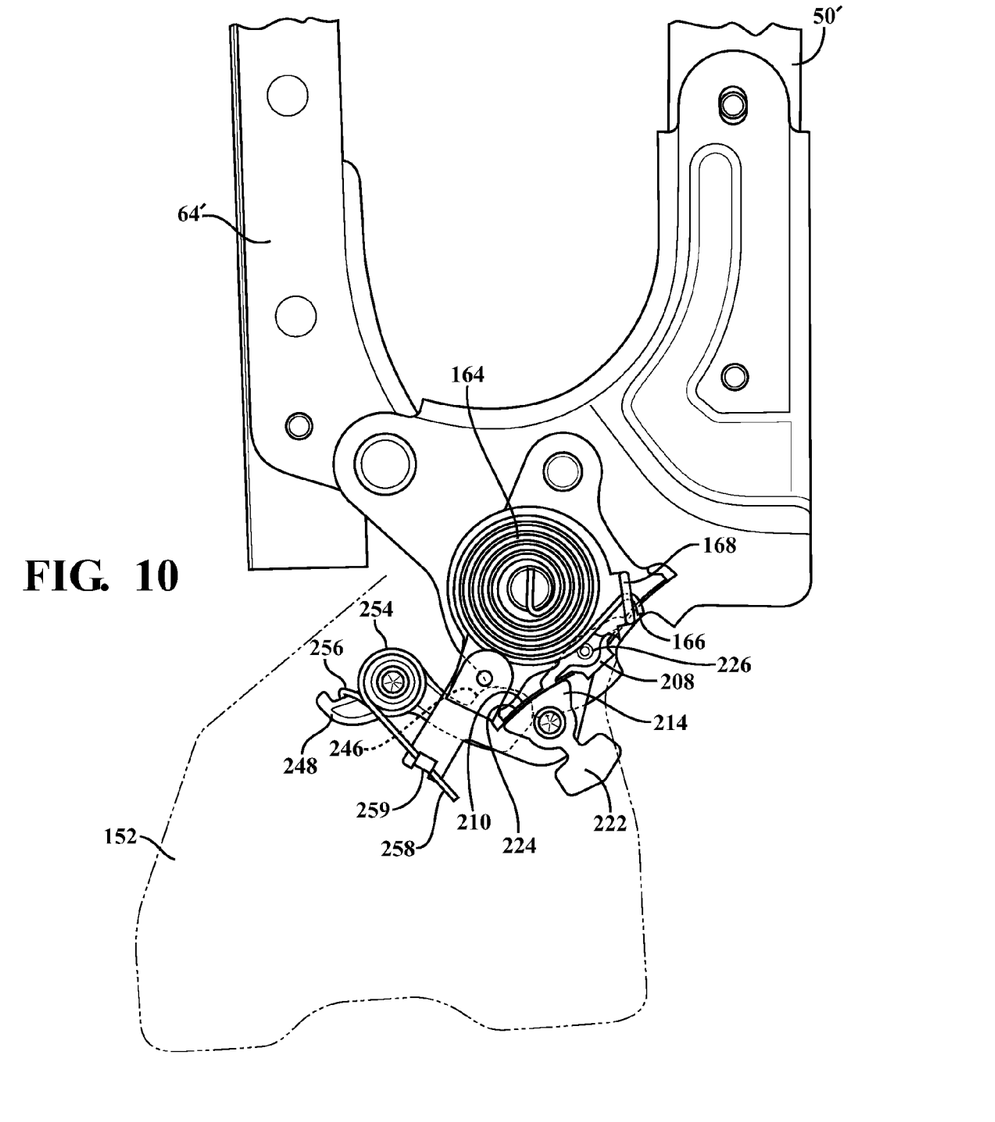
FIG. 10 is a corresponding enlarged side profile of the upright folded/stowed position of FIG. 8 and likewise better illustrating the shift in the pendulum relative to the second support shoulder established by the rotatably offset inertial support member, and corresponding to the manual displacement of the spring loaded detent to its re-established position relative to the second notched and circumferentially offset location of the seat bottom concurrent with the jump seat bottom being rotated to an upright/stowed position.
Figure 11:
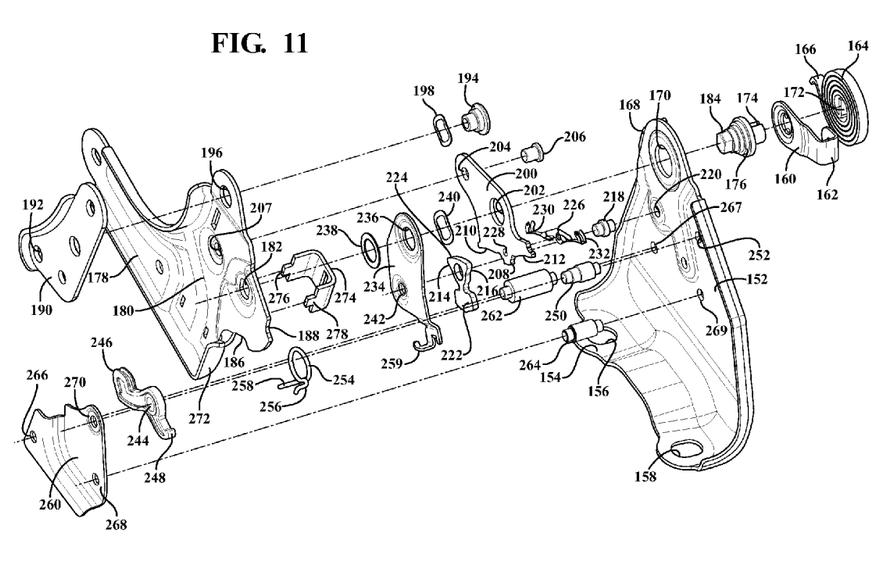
FIG. 11 is an exploded view of the latch design of FIG. 7.
Figure 12:
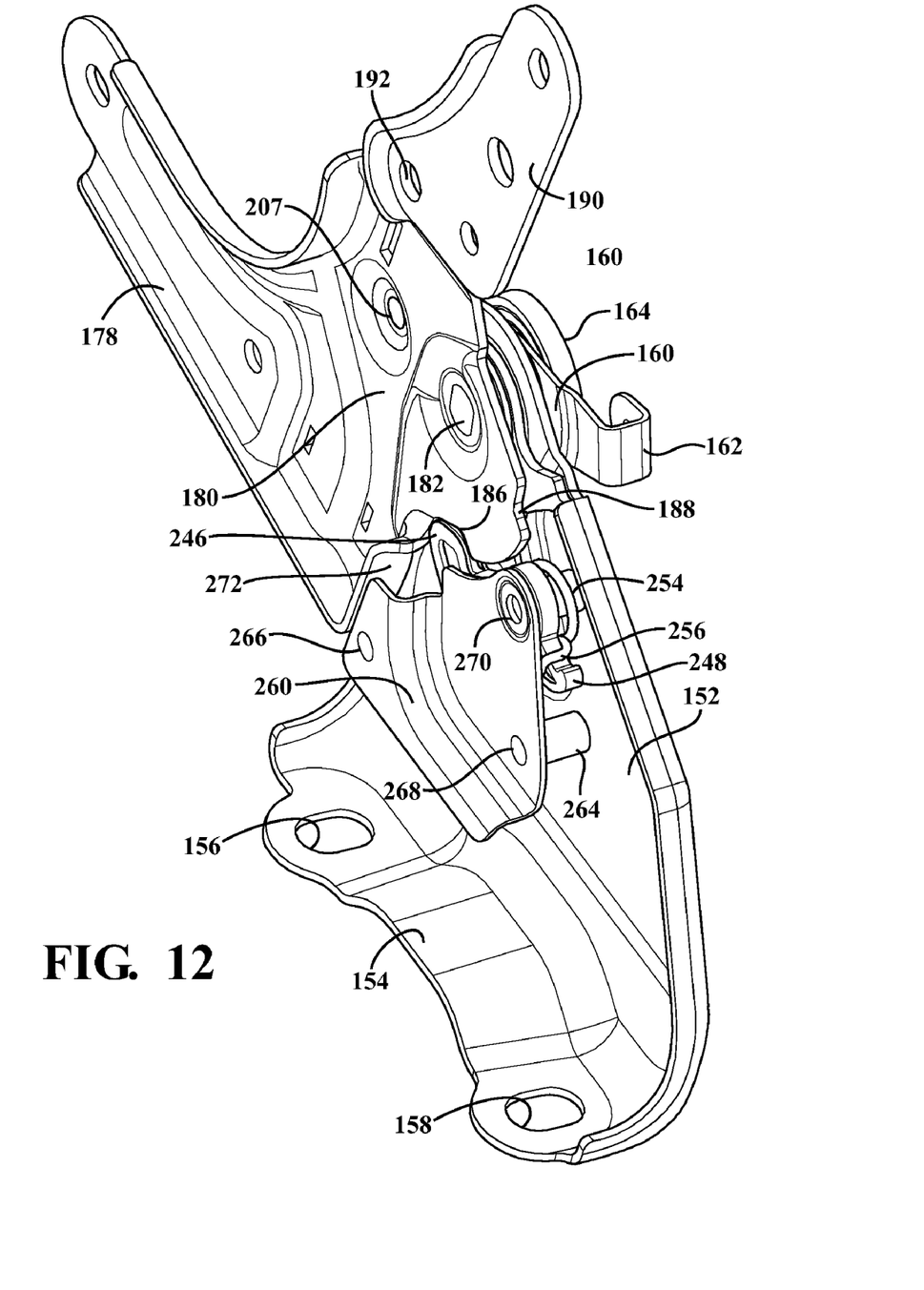
FIG. 12 is a corresponding assembled perspective view of the latch design of FIG. 7.

A modified "L" shaped frame is shown and includes a first leg 178 securing along an extending side of a seat bottom 50' (see as best shown in enlarged plan views of FIGS. 9 and 10). The frame further includes a second enlarged dimension leg 180 pivotally engaged at an intermediate location (see keyed aperture 182 as best shown in FIG. 11) which receives a keyed end profile (further at 184) associated with the main pivot pin 176 for pivotally slaving the seat bottom frame to the stanchion 152. An edge extending profile associated with the enlarged dimension leg further exhibits first 186 and second 188 spaced apart notched locations.

Figure 8:
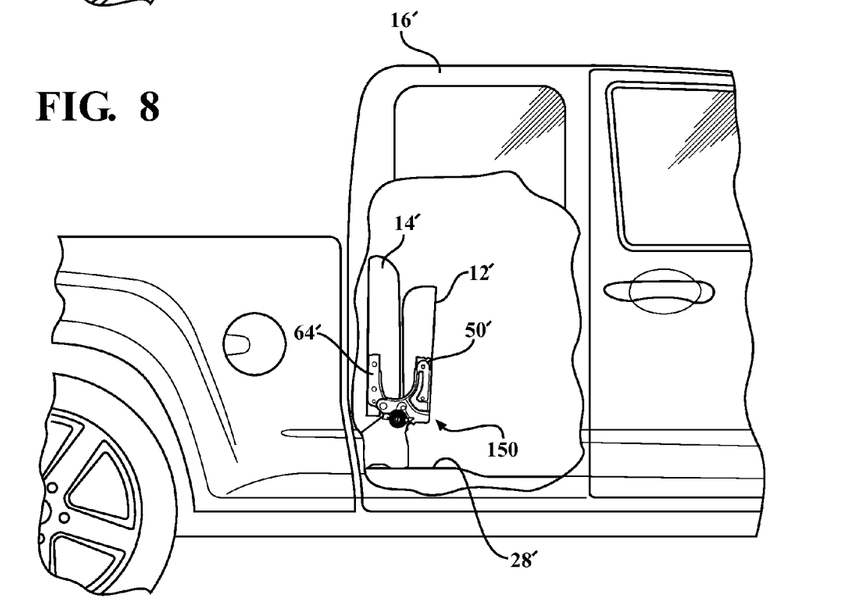
FIG. 8 is a succeeding view to FIG. 7 illustrating the range of pivotal motion of the seat bottom between the design position and an upwardly folded and stowed position, and further illustrating a corresponding combination angular and linear displacement of the seat back occurring during upward pivoting of the seat bottom.

A seat back frame supporting bracket 190 is pivotally secured, via receiving aperture 192 to a remote extending end of the enlarged dimension leg 178 offset from the pivotal engaged (keyed) location 182. Upward pivoting of the seat bottom 50', as depicted in FIGS. 8 and 10, causes the seat back frame supporting bracket 190 to simultaneously pivot a lower end of an associated seat back 64' (see each of FIGS. 7-10) in a rearward and non-interfering fashion relative to said upwardly folding seat bottom (see as further depicted in FIG. 8 and which illustrates the seat back 64' (in fairly identical fashion to the earlier variant depicted in FIG. 2) again pivoting rearwardly along a lower most location relative to the upward rotation of the seat bottom 50'.

As further best shown in FIG. 5, a seatback pivot pin 194 extends through an aperture 196 in the modified "L" shaped frame member (offset from main keyed pivot location 182) and engages the seat back supporting bracket 190 through its mounting aperture 192. A wave washer 198 is sandwiched between the pivot pin 194 and the opposing face of the seatback bracket 190 to facilitate smooth displacement of the seatback during its motion cycle indicated between FIGS. 9-10.

A substantially planar shaped sector is illustrated at 200 and likewise includes a steel or like construction. The sector 200 is anchored to an inboard side of the modified "L" shaped member in a pivotally slaved manner, and between the seat bottom member and the stanchion 152. A first (main) aperture 202 in the sector 200 receives the keyed insertion portion 184 of the main pivot pin 176, a secondary aperture 204 receiving a secondary mounting rivet 206 for securing the sector 200 in alignment with a further aperture 207 in the enlarged dimensioned leg 180 in a desired stand-off relationship. The sector 200 further exhibits a bottom extending surface including a generally central shoulder projection 208 separating the surface into first 210 and second 212 subset locations.

An inertially engaging pendulum is provided and includes a first upper and generally triangular shaped upper body portion 214 mounted in a slightly rotating and sandwiching fashion to the stanchion 152, via an upper location defined aperture 216 which receives an associated mounting rivet 218 likewise mounting to a further apertured location 220 in the stanchion 152. The pendulum further exhibits a weighted lower portion 222 extending integrally from the upper portion 214. An upper and slightly arcuate edge configuration 224 of the pendulum seats against a first location 210 of the sector 200, in abutting edge contact with the dividing projection 208, and concurrent with the seat bottom being in the downward design position of FIGS. 8 and 10.

An inertial responsive leaf spring 226 is secured to the underside of the sector 200 in substantially aligning and interposing fashion between the first 210 and second 212 bottom extending surfaces. A sector rivet (not shown) engages through a central mounting location associated with the leaf spring 226 and an adjoining mounting hole 228 defined in a lower location of the sector 200, in order to secure to the shoulder projection 208 of the sector 200. First and second outwardly extending wing portions associated with the leaf spring 226, see at 230 and 232, are secured in closely spaced fashion relative to the bottom surfaces 210 and 212 of the sector.

A fixed and supporting cover 234 exhibits a first 236 mounting aperture (with main pivot washer 238 arranged on one side of the cover 234 and pivot wave washer 240 on the other), a second mounting aperture 242 aligning with the pivotal supporting apertures associated with the sector 200 (at 202) and the pendulum (at 216). The cover 234 is configured so that it overlays the sector 200 and pendulum 214, 222 on an inboard side of the stanchion 152, between the stanchion and the seat bottom frame 48', 52'. The cover 234 is intended to provide additional structural support to the slaved sector 200 and inertial/pivotally responsive pendulum and, by virtue of the forces exerted during dynamic operation, to prevent the occurrence of undesirable misalignments between the components (in particular relating to the fairly tight tolerances which is established between the coactive upper surface 224 of the pendulum and bottom sections 210 and 212 and intermediate shoulder projection 208 of the sector 200) and which may otherwise compromise smooth operation of the assembly.

A detent style lever is configured (such as to include either a metal or plastic spring loaded part) to include a generally intermediate an aperture location 244 separating a first notch engaging end 246 and an opposite spring biased end 248. An associated detent rivet 250 seats through another aperture location 252 in the stanchion 152 and about which a secondary torsion spring 254 is supported, a curled end 256 thereof engaging the end 248 of the detent lever (with an opposite extending end 258 engaging an end location 259 of the mounted cover 234) so as to influence the notch engaging end 246 into contact with the selected notched location 210, 212 of the seat frame member.

A second fixed and supporting cover 260 partially overlaps the first cover 234 and is mounted by a series of stop rivet 262, spacer rivet 264 and detent lever supporting rivet (previously at 250) seating through aligning apertures 266, 268 and 270 at corner locations of the second cover 260, as well as aperture 267 (seating stop rivet 262) and 269 (seating spacer rivet 264) defined in the stanchion 18. In this manner, the second cover 260 is mounted on an inboard side of the stanchion 152 in interposed fashion between the stanchion and seat bottom frame (legs 178, 180), with the stop rivet 262 abutting a configured opposing edge 272 of the seat bottom frame at a lower most rotated position. Additional features include a U shaped plastic attachment/cushion bracket 274 with spaced apart extending and end defining legs terminating in mounting tabs 276 and 278 which secure the bracket to an outboard location of the seat bottom frame enlarged leg 180 in a manner which assists in spatially positioning the first cover 234.

Having described my invention, other and additional preferred embodiments will become apparent to those skilled in the art to which it pertains, and without deviating from the scope of the appended claims.

I claim:

1. A latch assembly incorporated into a stadium style vehicle seat, comprising:

a floor mounted stanchion exhibiting an upwardly extending support surface;

a modified "L" shaped frame with a first leg securing along an extending side of a seat bottom and a second enlarged dimension leg pivotally engaged at an intermediate location to an upper end of said stanchion, an edge extending profile associated with said enlarged dimension leg further comprising first and second spaced apart notched locations;

a sector pivotally slaved to an inside face of said second leg of said seat bottom frame opposing said stanchion support surface, said sector exhibiting a bottom extending surface including a generally central located shoulder projection separating said surface into first and second locations;

a pendulum shaped member pivotally secured to said stanchion support surface and exhibiting an upper end profile which seats against a first sector location in edge abutting contact with said shoulder, concurrent with said seat bottom in a downward design position;

a detent style lever pivotally mounted in spring loaded fashion to another location of said stanchion support surface and seating in biased fashion against said first notched location of said "L" shaped frame so as to maintain said seat bottom in said downward design position; and upon said seat bottom being grasped by a user and rotated in an upward direction, said detent lever being caused to pivot out of engagement with said first notched location and travel along said edge extending profile simultaneous with said sector displacing relative to said pendulum so that said shoulder traverses along said upper end profile, upon said seat bottom rotating to an upwardly folded position, said detent lever re-establishing seating engagement with said second notched location concurrent with said pendulum pivoting into engagement with said second sector location in opposite edge abutting contact with said shoulder;

said pendulum additionally responding to an inertial impact condition not associated with manual controlled rotation of the seat bottom, in either of said design or upright folded positions, by engaging said shoulder projection associated with said slaved sector to thereby prevent rotation of the first seat component.

2. The latch assembly as described in claim 1, further comprising a pair of spaced apart stanchions between which is pivotally supported the seat bottom supporting frame.

3. The latch assembly as described in claim 1, a seat back frame supporting bracket pivotally secured to a remote extending end of said enlarged dimension leg offset from said pivotal engaged location and, upward pivoting of said seat bottom, causing said seat back frame supporting bracket to simultaneously pivot a lower end of said associated seat back in a rearward and non-interfering fashion relative to said upwardly folding seat bottom.

4. The latch assembly as described in claim 1, further comprising a clock spring supported upon a reverse face of said stanchion and including an extending end engaging a fixed tab projecting from said stanchion, an inwardly curled end of said clock spring seating within a notch associated with a main pin seating through aligning apertures in said interposed sector and seat bottom frame for pivotally supporting said frame and sector in further slaved fashion to said stanchion and such that said spring biases said pin and frame in a selected direction.

5. The latch assembly as described in claim 1, further comprising a leaf spring secured to said sector in substantially aligning and interposing fashion between first and second bottom extending surfaces separated by said shoulder projection of said seat sector and said proximate located upper end profile of said pendulum, said leaf spring being initially spaced away from said sector upon contacting said pendulum, said leaf spring being compressed to align with said sector surfaces and upper edge of said pendulum.

6. The latch assembly as described in claim 1, further comprising a rivet extending through an aperture established in an upper body portion of said pendulum, proximate said upper end profile, and seating through an aperture in said stanchion support surface, said pendulum further comprising a weighted lower portion extending integrally from said upper body portion.

7. The latch assembly as described in claim 2, further comprising first and second pairs of spaced apart stanchion supports, each pivotally supporting a seat bottom supporting frame arranged on opposite ends of first and second seat components associated with a 60/40 rear stadium seat assembly, a first latch assembly being arranged on a first side of a first selected seat component, a second latch assembly being arranged on a second opposite most side of a second selected seat component.

8. The latch assembly as described in claim 1, further comprising a detent lever supporting rivet seating through an aperture at a generally intermediate location of said lever and separating a notch engaging end and an opposite spring biased end which is influenced by a torsion spring mounted around said lever supporting rivet.

9. The latch assembly as described in claim 1, further comprising a fixed and supporting cover exhibiting first and second mounting apertures aligning with pivotal supporting apertures associated with said sector and pendulum, said cover overlaying said sector and pendulum on an inboard side of said stanchion between said stanchion and said seat bottom frame.

10. The latch assembly as described in claim 9, further comprising a second fixed and supporting cover partially overlapping said first cover and which is mounted by a series of stop rivet, spacer rivet and detent lever supporting rivet seating through aligning apertures at corner locations of said second cover which mount said second cover on an inboard side of said stanchion interposed fashion between said stanchion and said seat bottom frame, said stop rivet abutting a configured opposing edge of said seat bottom frame at a lower most rotated position.

11. A latch assembly incorporated into a stadium style vehicle seat, comprising:
a floor mounted stanchion exhibiting an upwardly extending support surface;
a seat bottom frame having a first leg securing along an extending side of an associated and cushion supporting seat bottom, a second enlarged dimension leg extending at an angle relative to said first leg and being pivotally engaged, at an intermediate location, to said stanchion, an edge extending profile associated with said second leg and further comprising first and second spaced apart notched locations;
a sector pivotally slaved to an inside face of said second leg opposing said stanchion support surface, said sector exhibiting a bottom extending surface exhibiting a shoulder projection separating said surface into first and second locations;
a pendulum member pivotally secured to said stanchion support surface and exhibiting an upper end profile which seats against a first sector location in edge abutting contact with said shoulder, concurrent with said seat bottom in a downward design position;
a detent style lever pivotally mounted in spring loaded fashion to another location of said stanchion support surface and seating in biased fashion against said first notched location of said "L" shaped frame so as to maintain said seat bottom in said downward design position;
upon said seat bottom being grasped by a user and rotated in an upward direction, said detent lever being caused to pivot out of engagement with said first notched location and travel along said edge extending profile simultaneous with said sector displacing relative to said pendulum so that said shoulder traverses along said upper end profile, upon said seat bottom rotating to an upwardly folded position, said detent lever re-establishing seating engagement with said second notched location concurrent with said pendulum pivoting into engagement with said second sector location in opposite edge abutting contact with said shoulder; and
a seat back frame supporting bracket pivotally secured to a remote extending end of said enlarged dimension leg offset from said pivotal engaged location and, upward pivoting of said seat bottom, causing said seat back frame supporting bracket to simultaneously pivot a lower end of said associated seat back in a rearward and non-interfering fashion relative to said upwardly folding seat bottom.

12. The latch assembly as described in claim 11, further comprising a pair of spaced apart stanchions between which is pivotally supported the seat bottom supporting frame.

13. The latch assembly as described in claim 11, further comprising a clock spring supported upon a reverse face of said stanchion and including an extending end engaging a fixed tab projecting from said stanchion, an inwardly curled end of said clock spring seating within a notch associated with a main pin seating through aligning apertures in said interposed sector and seat bottom frame for pivotally supporting said frame and sector in further slaved fashion to said stanchion and such that said spring biases said pin and frame in a selected direction.

14. The latch assembly as described in claim 11, further comprising a leaf spring secured to said sector in substantially aligning and interposing fashion between first and second bottom extending surfaces separated by said shoulder projection of said seat sector and said proximate located upper end profile of said pendulum, said leaf spring being initially spaced away from said sector upon contacting said pendulum, said leaf spring being compressed to align with said sector surfaces and upper edge of said pendulum.

15. The latch assembly as described in claim 11, further comprising a rivet extending through an aperture established in an upper body portion of said pendulum, proximate said upper end profile, and seating through an aperture in said stanchion support surface, said pendulum further comprising a weighted lower portion extending integrally from said upper body portion.

16. The latch assembly as described in claim 12, further comprising first and second pairs of spaced apart stanchion supports, each pivotally supporting a seat bottom supporting frame arranged on opposite ends of first and second seat components associated with a 60/40 rear stadium seat assembly, a first latch assembly being arranged on a first side of a first selected seat component, a second latch assembly being arranged on a second opposite most side of a second selected seat component.

17. The latch assembly as described in claim 11, further comprising a detent lever supporting rivet seating through an aperture at a generally intermediate location of said lever and separating a notch engaging end and an opposite spring biased end which is influenced by a torsion spring mounted around said lever supporting rivet.

18. The latch assembly as described in claim 11, further comprising a fixed and supporting cover exhibiting first and second mounting apertures aligning with pivotal supporting apertures associated with said sector and pendulum, said cover overlaying said sector and pendulum on an inboard side of said stanchion between said stanchion and said seat bottom frame.

19. The latch assembly as described in claim 18, further comprising a second fixed and supporting cover partially overlapping said first cover and which is mounted by a series of stop rivet, spacer rivet and detent lever supporting rivet seating through aligning apertures at corner locations of said second cover which mount said second cover on an inboard side of said stanchion interposed fashion between said stanchion and said seat bottom frame, said stop rivet abutting a configured opposing edge of said seat bottom frame at a lower most rotated position.

20. A latch assembly incorporated into a stadium style seat, comprising:
- a floor mounted stanchion exhibiting an upwardly extending support surface;
- a modified "L" shaped frame with a first leg securing along an extending side of a seat bottom and a second enlarged dimension leg pivotally engaged at an intermediate location to an upper end of said stanchion, an edge extending profile associated with said enlarged dimension leg further comprising first and second spaced apart notched locations;
- a sector pivotally slaved to an inside face of said second leg of said seat bottom frame opposing said stanchion support surface, said sector exhibiting a bottom extending surface including a generally central located shoulder projection separating said surface into first and second locations;
- a pendulum shaped member pivotally secured to said stanchion support surface and exhibiting an upper end profile which seats against a first sector location in edge abutting contact with said shoulder, concurrent with said seat bottom in a downward design position;
- a detent style lever pivotally mounted in spring loaded fashion to another location of said stanchion support surface and seating in biased fashion against said first notched location of said "L" shaped frame so as to maintain said seat bottom in said downward design position;
- upon said seat bottom being grasped by a user and rotated in an upward direction, said detent lever being caused to pivot out of engagement with said first notched location and travel along said edge extending profile simultaneous with said sector displacing relative to said pendulum so that said shoulder traverses along said upper end profile, upon said seat bottom rotating to an upwardly folded position, said detent lever re-establishing seating engagement with said second notched location concurrent with said pendulum pivoting into engagement with said second sector location in opposite edge abutting contact with said shoulder; and
- a seat back frame supporting bracket pivotally secured to a remote extending end of said enlarged dimension leg offset from said pivotal engaged location and, upward pivoting of said seat bottom, causing said seat back frame supporting bracket to simultaneously pivot a lower end of said associated seat back in a rearward and non-interfering fashion relative to said upwardly folding seat bottom.

\* \* \* \* \*